United States Patent
Lin et al.

(10) Patent No.: US 7,925,116 B2
(45) Date of Patent: Apr. 12, 2011

(54) METHOD AND APPARATUS TO FACILITATE FORMING A COMPENSATED IMAGE OF A WIDE-ANGLE IMAGE

(75) Inventors: Ruei-Sung Lin, Schaumburg, IL (US); James E. Crenshaw, Palatine, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 838 days.

(21) Appl. No.: 11/924,254

(22) Filed: Oct. 25, 2007

(65) Prior Publication Data

US 2009/0110329 A1    Apr. 30, 2009

(51) Int. Cl.
*G06K 9/20* (2006.01)
(52) U.S. Cl. .................... 382/293; 382/276
(58) Field of Classification Search .......... 382/279, 382/293
See application file for complete search history.

(56) References Cited

U.S. PATENT DOCUMENTS

| | | | |
|---|---|---|---|
| 5,796,426 A | | 8/1998 | Gullichsen et al. |
| 7,058,237 B2 * | | 6/2006 | Liu et al. .................... 382/276 |
| 7,099,521 B2 * | | 8/2006 | Liu et al. .................... 382/276 |
| 2002/0190987 A1 | | 12/2002 | Travers et al. |
| 2004/0088732 A1 | | 5/2004 | Martin et al. |
| 2010/0033551 A1 * | | 2/2010 | Agarwala et al. ............ 348/36 |

FOREIGN PATENT DOCUMENTS

| | | |
|---|---|---|
| EP | 1 141 760 B1 | 9/2004 |
| JP | 2001-024903 A | 1/2001 |

OTHER PUBLICATIONS

Claus et al., "A Plumbline Constraint for the Rational Function Lens Distortion Model," British Machine Vision Conference, 2005; 10 pages.
Claus et al., "A Rational Function Lens Distortion Model for General Cameras," Department of Engineering Science, University of Oxford; 7 pages.
Fitzgibbon, Andrew W., "Simultaneous Linear Estimation of Multiple View Geometry and Lens Distortion," Department of Engineering Science; 8 pages.
Jae Chul Shin, "PCT International Search Report and Written Opinion," WIPO, ISA/KR, Korean Intellectual Property Office, Daejeon, Republic of Korea, Mar. 13, 2009, 11 pages.

* cited by examiner

*Primary Examiner* — Bhavesh M Mehta
*Assistant Examiner* — Stephen R Koziol

(57) ABSTRACT

Straight lines in a compensated image of a wide-angle image are identified (102) and corresponding curved lines of pixels in the wide-angle image identified (103) as well. For given points in the aforementioned straight lines, a corresponding point in the corresponding curved lines is identified by determining an intersection of those curved lines with another line of pixels in the wide-angle image (104). The latter can comprise either a curved line that corresponds to another straight line in the compensated image, in which case the intersection is noted by tracing the curved lines using a scan-rasterization algorithm. The latter can also comprise, if desired, a straight line that corresponds to another straight line in the compensated image. In either case, the point of intersection is readily and efficiently determined.

12 Claims, 3 Drawing Sheets

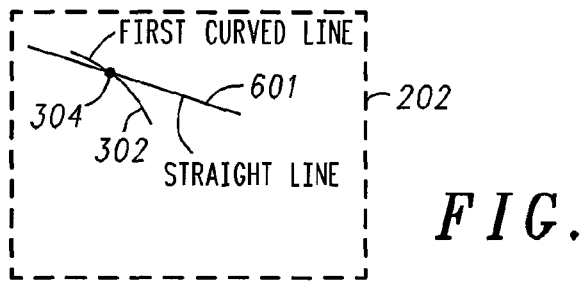

FIG. 6

```
┌─ DETERMINE WHEN USE OF THE SUBSTANTIALLY STRAIGHT LINE OF PIXELS ─┐
│  IN THE DIGITAL REPRESENTATION OF THE WIDE-ANGLE IMAGE AS DIRECTLY │
│  CORRELATE TO THE SECOND SUBSTANTIALLY STRAIGHT LINE OF PIXELS TO  │
│    IDENTIFY AN INTERSECTION WITH THE FIRST SUBSTANTIALLY CURVED    │
│         LINE OF PIXELS IS UNDESRIABLE AND RESPONSIVELY:            │
│                                                                     │—701
│   -IDENTIFY A THIRD SUBSTANTIALLY STRAIGHT LINE OF PIXELS          │
│    THAT IS AT LEAST SUBSTANTIALLY ORTHOGONAL TO THE                │
│    FIRST SUBSTANTIALLY STRAIGHT LINE OF PIXELS:                    │
│   -IDENTIFY A THIRD SUBSTANTIALLY CURVED LINE OF PIXELS            │
│    IN THE DIGITAL REPRESENTATION OF THE WIDE-ANGLE                 │
│    IMAGE AS DIRECTLY CORRELATE TO THE THIRD                        │
│    SUBSTANTIALLY STRAIGHT LINE OF PIXELS;                          │
└─────────────────────────────────┬───────────────────────────────────┘
                                  ▼
┌─── USE AN INTERSECTION OF THE THIRD SUBSTANTIALLY CURVED LINE OF ───┐
│    PIXELS AND THE SUBSTANTIALLY STRAIGHT LINE OF PIXELS IN THE      │—702
│      DIGITAL REPRESENTATION OF THE WIDE-ANGLE IMAGE AS THE          │
│    CORRESPONDING POINT TO THEREBY FACILITATE IDENTIFYING THE        │
│              GIVEN POINT FOR THE GIVEN PIXEL                        │
└─────────────────────────────────────────────────────────────────────┘
                                                                  700
```

FIG. 7

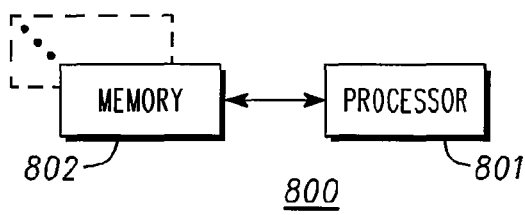

FIG. 8

METHOD AND APPARATUS TO FACILITATE FORMING A COMPENSATED IMAGE OF A WIDE-ANGLE IMAGE

TECHNICAL FIELD

This invention relates generally to digital images and more particularly to wide-angle images and the formation of corresponding compensated images.

BACKGROUND

Digital images are known in the art and typically comprise a representation of a two-dimensional image as a finite set of digital values (often denoted as picture elements or pixels). Such a digital image typically contains a fixed number of rows and columns of pixels. Pixels are essentially small picture areas that contain quantized values that represent the brightness at various points of the image. Typically, these pixels are stored in computer memory as a so-called raster image or raster map that typically comprises a two-dimensional array of small integers.

Wide-angle images are also known in the art. Wide-angle lenses typically comprise a lens whose focal length is substantially shorter than the focal length of a more normal lens. Such a lens typically yields an extremely wide, hemispherical image and can serve to facilitate capturing a relatively broad field of view. At least some wide-angle lenses, such as so-called fisheye lenses, do not produce a rectilinear image. When working with digital images in a digital realm, however, it is possible to mathematically compensate for such distortion to thereby present a user with a compensated image comprising an essentially rectilinear image.

While such prior art techniques tend to be successful with respect to yielding a non-distorted rendered image, such prior art approaches tend to be relatively mathematically intensive. For some application settings, this requirement poses no special burden. For other application settings, however, such as when facilitating so-called pan/tilt/zoom functionality in a digital context, such computational requirements can become burdensome or even a point of failure. This, in turn, can result in unacceptably slow or even incomplete image manipulation.

BRIEF DESCRIPTION OF THE DRAWINGS

The above needs are at least partially met through provision of the method and apparatus to facilitate forming a compensated image of a wide-angle image described in the following detailed description, particularly when studied in conjunction with the drawings, wherein:

FIG. 6 comprises a diagrammatic schematic view as configured in accordance with various embodiments of the invention;

FIG. 7 comprises a flow diagram as configured in accordance with various embodiments of the invention; and FIG. 8 comprises a block diagram as configured in accordance with various embodiments of the invention.

Figure 1:
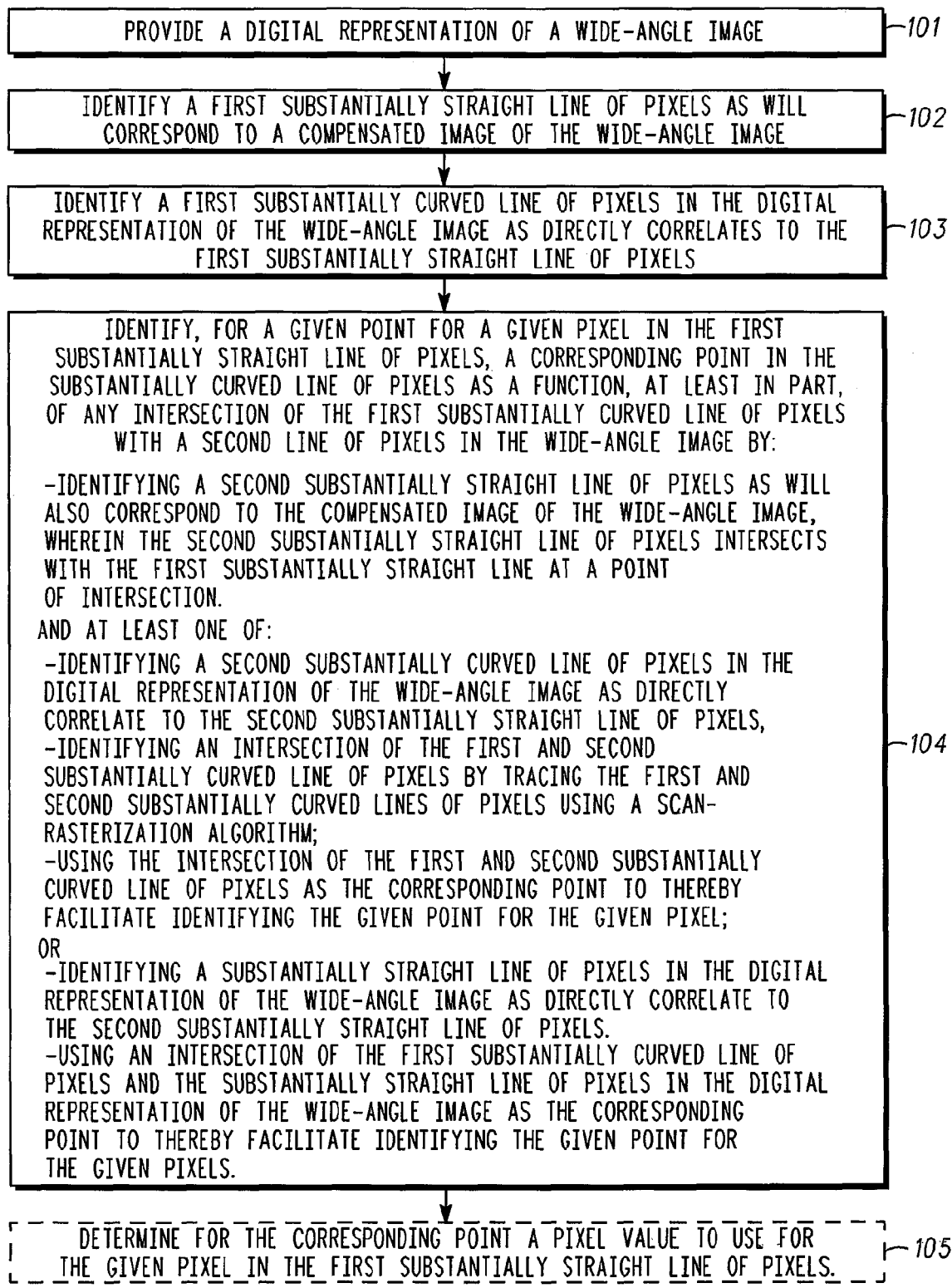
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, one provides a digital representation of a wide-angle image and then identifies a first substantially straight line of pixels as will correspond to a compensated image of the wide-angle image. One can then identify a first substantially curved line of pixels in the digital representation of the wide-angle image as directly correlates to the first substantially straight line of pixels. These teachings then provide for identifying, for a given point for a given pixel in the first substantially straight line of pixels, a corresponding point in the first substantially curved line of pixels as a function, at least in part, of an intersection of the first substantially curved line of pixels with a second line of pixels in the wide-angle image by first identifying a second substantially straight line of pixels as will also correspond to the compensated image of the wide-angle image, wherein the second substantially straight line of pixels intersects with the first substantially straight line of pixels at a point of intersection.

By one approach, one then identifies a second substantially curved line of pixels in the digital representation of the wide-angle image as directly correlates to the second substantially straight line of pixels. One also identifies an intersection of the first and second substantially curved line of pixels by tracing the first and second substantially curved lines of pixels using a scan-rasterization algorithm. This intersection is then used as the aforementioned corresponding point to thereby facilitate identifying the given point for the given pixel.

By another approach, if desired, one identifies a substantially straight line of pixels in the digital representation of the wide-angle image as directly correlate to the second substantially straight line of pixels and then uses an intersection of the first substantially curved line of pixels and the substantially straight line of pixels in the digital representation of the wide-angle image as the corresponding point to thereby facilitate identifying the given point for the given pixel.

In some cases, it is possible for the latter approach to become anecdotally burdensome. Therefore, if desired, one can further optionally provide for determining when the use of the substantially straight line of pixels in the digital representation of the wide-angle image as directly correlates to the second substantially straight line of pixels to identify an intersection with the first substantially curved line of pixels is undesirable and, when true, identify instead a third substantially straight line of pixels that is at least substantially orthogonal to the first substantially straight line of pixels and a third substantially curved line of pixels in the digital representation of the wide-angle image as directly correlate to the third substantially straight line of pixels. One can then use an intersection of the third substantially curved line of pixels and the substantially straight line of pixels in the digital representation of the wide-angle image as the corresponding point to thereby facilitate identifying the given pint for the given pixel.

Regardless of which approach one uses, these teachings can then accommodate determining for the corresponding point a pixel value to use for the given pixel in the first substantially straight line of pixels. So configured, these teachings comprise a readily enabled and highly efficient mechanism for quickly yielding a compensated version of a wide-angle image. The corresponding computational requirements are sufficiently reduced using these teachings to readily support a variety of aggressive pan, tilt, and/or zoom image manipulations in real time in a wide variety of implementing platforms.

These and other benefits may become clearer upon making a thorough review and study of the following detailed description. Referring now to the drawings, and in particular to FIG. 1, an illustrative process 100 suitable to represent at least certain of these teachings will be described.

Figure 2:
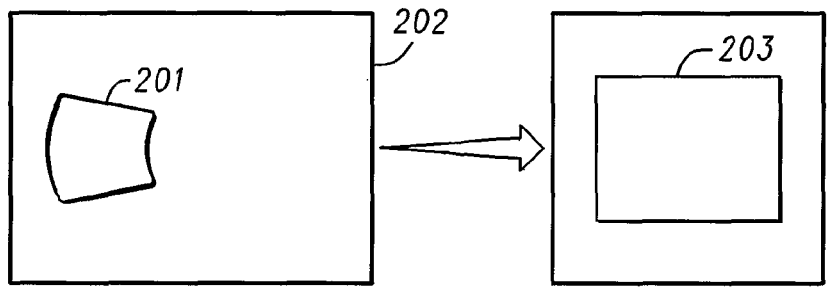
FIG. 2 comprises a diagrammatic schematic view as configured in accordance with various embodiments of the invention.

To begin, this process 100 begins with provision 101 of a digital representation of a wide-angle image. Referring momentarily to FIG. 2, such a digital representation 201 will typically reside within a given wide-angle field of view 202. The digital representation of a wide-angle image 201 will be comprised of pixels in accordance with well-understood prior art technique in this regard and may comprise essentially any desired format or subject.

For the sake of simplicity and the purposes of illustration, this description presumes that the image itself comprises a wide-angle image of a rectangle (where the dimensions and shape of this image as shown may further be exaggerated or distorted for the sake of illustration). Those skilled in the art will understand that such an image may comprise a still image or may comprise a portion (such as a frame) of a video work. A significant application of these teachings is to ultimately facilitate providing a substantially compensated image 203 as corresponds to the wide-angle image. For most application settings, this will comprise providing a substantially non-distorted image.

Figure 3:
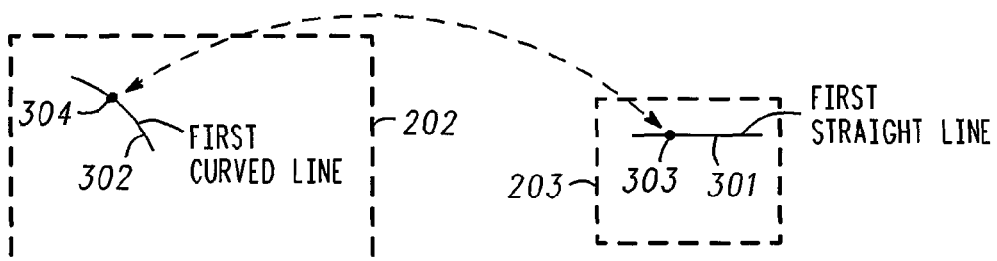
FIG. 3 comprises a diagrammatic schematic view as configured in accordance with various embodiments of the invention.

Referring again to FIG. 1, this process 100 then provides for identifying 102 a first substantially straight line of pixels as will correspond to a compensated image of the wide-angle image. Referring now momentarily to FIG. 3, such a line is denoted by reference numeral 301 and comprises, as shown, a part of what will become the compensated image 203. Those skilled in the art will understand that this step does not comprise knowing or even guessing what the pixel values of this first substantially straight line of pixels 301 are at this point; this step merely provides for identifying this line 301 in a more general way in terms of its location.

As shown, this line 301 can comprise a horizontal substantially straight line of pixels, but other possibilities exist. As one simple illustrative example in this regard, this line can comprise instead a vertical substantially straight line of pixels.

Referring again to FIG. 1, this process 100 next provides for identifying 103 a first substantially curved line of pixels in the digital representation of the wide-angle image as directly correlates to the first substantially straight line of pixels. FIG. 3 illustrates such a result through depiction of a first curved line that is denoted by reference numeral 302. The identification of such a first curved line 302 that correlates to the first straight line 301 comprises a relatively straight forward calculation that is well within the understanding of those skilled in the art and requires no further elaboration here.

Returning to FIG. 1, one then identifies 104, for a given point for a given pixel in the first substantially straight line of pixels, a corresponding point in the first substantially curved line of pixels as a function, at least in part, of an intersection of the first substantially curved line of pixels with a second line of pixels in the wide-angle image. Referring again to FIG. 3, such a given point for a given pixel in the first substantially straight line of pixels 301 is denoted by reference numeral 303. The corresponding point on the first curved line 302 in the wide-angle image is denoted by reference numeral 304 with the goal of this step being to ascertain the location of that point 304 as a function of an intersection between that first curved line 302 and another, second line of pixels in that wide-angle image.

By one approach, this second line of pixels can comprise a substantially curved line. By another approach, this second line of pixels can comprise a substantially straight line. Each of these approaches will now be described in detail.

Curved Line Approach

Figure 4:
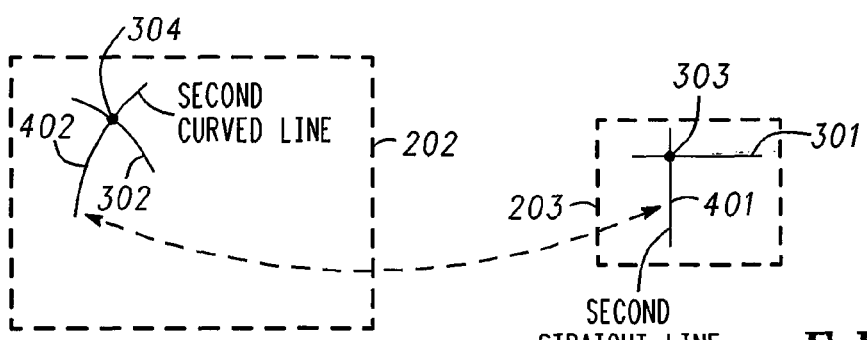
FIG. 4 comprises a diagrammatic schematic view as configured in accordance with various embodiments of the invention.

With simultaneous reference to both FIGS. 1 and 4, the identification of this point of intersection can begin with identifying a second substantially straight line of pixels 401 that comprises, in contrast to the substantially horizontal orientation of the first substantially straight line 301, a substantially vertical line. By this approach, this second substantially straight line of pixels 401 intersects with the first substantially straight line of pixels 301 at a point of intersection that comprises the aforementioned given point 303.

This process 100 now provides for identifying a second substantially curved line of pixels 402 in the digital representation of the wide-angle image as directly correlates to this second substantially straight line of pixels 401. The point of intersection between these two curved lines 302 and 402 will of course correlate to the given point of interest 304. There are various ways by which this intersection can be determined. By one approach, however, this comprises identifying the intersection of the first and second substantially curved lines 302 and 402 by essentially tracing these two lines 302 and 402 using a scan-rasterization algorithm.

Such scan-rasterization algorithms are known in the art and will serve in this context to rapidly and efficiently identify the point of intersection and hence the point of interest 304. [note to inventors—is there anything we can offer here to be more specific? For example, is there any such algorithm that is known in the art by a particular name that we could reference here?] As the present teachings are not overly sensitive to the selection of any particular approach in this regard, for the sake of brevity and the preservation of clarity additional elaboration in this regard will not be provided here.

Straight Line Approach

Figure 5:
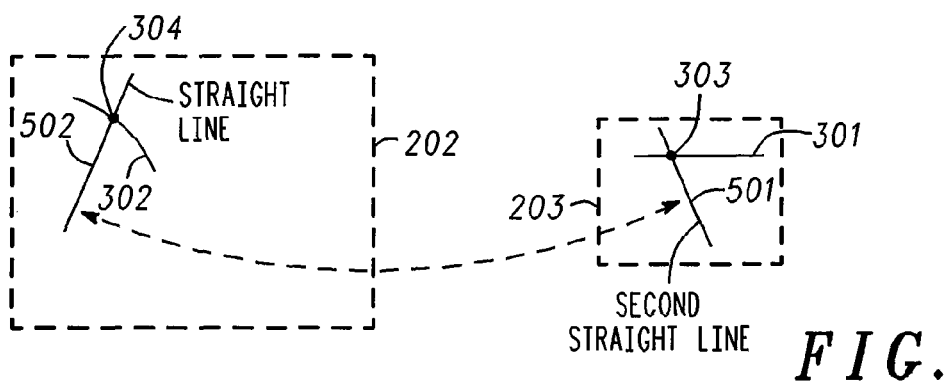
FIG. 5 comprises a diagrammatic schematic view as configured in accordance with various embodiments of the invention.

Referring now simultaneously to FIGS. 1 and 5, by this approach one identifies 104 a second substantially straight line of pixels 501 as will also correspond to the compensated image of the wide-angle image, wherein this second substantially straight line of pixels 501 will again intersect with the first substantially straight line of pixels 301 at a point of intersection that correlates to the given point of interest 303.

By this approach, however, this second substantially straight line of pixels 501 correlates to a substantially straight line of pixels 502 in the digital representation of the wide-angle image. This process 100, by this approach, therefore provides for identifying a substantially straight line of pixels 502 in the digital representation of the wide-angle image as directly correlates to the second substantially straight line of pixels 501. Such a relationship prevails, for example, when these straight lines correlate to lines that at least substantially intersect a center of a lens by which the wide-angle image was captured. (Those skilled in the art will recognize that the straight line 502 depicted in FIG. 5 may not literally accord with such a condition and is as shown for the sake of simplicity and clarity.)

In this case, where the curved line 302 of interest in the wide-angle image intersects a substantially straight line 502, the mathematical calculations required to determine the point of intersection (and hence the given point of interest 304) is considerably reduced. This being the case, this process 100 will accommodate the use of a mathematical analysis of choice to identify the point of intersection. (Various choices are known in the art in this regard and these teachings are not overly sensitive to the selection of any particular approach in this regard.) This intersection, once determined, can then be used as the corresponding point of interest to thereby facilitate identifying the given point 304 for the given pixel.

This straight line approach provides excellent operational performance in general, but the computational complexity of the process of identifying the point of intersection can become more involved when the slope of the curved and straight lines 302 and 601 (as shown in FIG. 6) become too similar to one another. Therefore, and referring now to FIG. 7, if desired, the described process 100 can optionally further provide for determining 701 when use of the substantially straight line of pixels 601 in the digital representation of the wide-angle image as directly correlates to the second substantially straight line of pixels to identify an intersection with the first substantially curved line of pixels is undesirable. This determination can be based, for example, upon determining when the slopes of these two lines are too similar to one another. This might comprise, for example, determining that the slopes are within 1% of one another, 5% of one another, 10% of one another, or some other threshold of interest as may relate to a given application setting.

When true, this process 700 can then provide for responsively identifying a third substantially straight line of pixels that is at least substantially orthogonal to the first substantially straight line of pixels and then identifying a third substantially curved line of pixels in the digital representation of the wide-angle image as directly correlates to the third substantially straight line of pixels. An intersection between this third substantially curved line of pixels and the substantially straight line of pixels in the digital representation of the wide-angle image can then be used 702 as the aforementioned corresponding point to thereby facilitate identifying the given point for the given pixel.

Once the corresponding point of interest 304 in the wide-angle image has been identified using one or more of the above-described approaches, this process 100 can then optionally provide for determining 105, for that point 304, a pixel value to use for the given point 303 in the first substantially straight line of pixels 301 as will comprise a part of the compensated image 203. In some cases this might comprise simply noting the value of a single pixel value that relates, directly and solely, to this particular point 304. More typically, however, this will likely comprise, at least in part, calculating the pixel value as a function of a plurality of pixel values that are at least proximal to the corresponding point 304 in the first substantially curved line of pixels as this point 304, in many cases, will not correlate directly and solely with only a single pixel. This calculation can vary with the needs of a given application setting but can comprise, for example, noting and averaging all pixel values within a given distance of that point 304.

For the benefit of the interested reader, additional details are now provided with respect to certain implementation possibilities as relate to these teachings.

Radial Distortion

Let $r=(x', y', z')^T$ be a 3D ray that passes through a pinhole, undergoes lens refraction, and hits pixel $(u.v)^T$ on an image sensor. By assuming the lens distortion is purely radial, there exists a one-to-one nonlinear mapping between ray $(x', y', z')^T$ and point $(u.v)^T$ such that $$\begin{pmatrix} x' \\ y' \\ z' \end{pmatrix} \propto \begin{pmatrix} u \\ v \\ f(u, v) \end{pmatrix}.$$

Line-to-Conic Mapping

Let $P=(n_x, n_y, n_z)^T$ be a 2D plane that contains the ray r, $$n_x x' + n_y y' + n_z z' = 0$$

By putting a virtual plan perpendicular to the optic axis to intersect P, one obtains a perspective line:

$$l_1 x + l_2 y + l_3 = 0$$

where $l=(l_1,l_2,l_3)^T=(n_x/f, n_y/f, n_z f)^T$ and f comprises the focal length.

It is known that this perspective line will become a curve after radial lens distortion, and the curve can be approximately fitted by a conic. The present teachings propose a line-conic mapping that is capable of modeling radially distorted lens with field of view close to 180 degrees with high accuracy.

Let $c=(c_1, c_2, c_3, c_4, c_5, c_6)^T$ be the conic coefficients. The conic that passes through $(u.v)^T$ satisfies the following constraint, $$c_1 u^2 + c_2 uv + c_3 v^2 + c_4 u + c_5 v + c_6 = 0$$

One can define the mapping from line l to conic c as:

$$\begin{pmatrix} c_1 \\ c_2 \\ c_3 \\ c_4 \\ c_5 \\ c_6 \end{pmatrix} = A\varphi(l)$$

$$= \begin{bmatrix} A_{1,1} & A_{1,2} & A_{1,3} & A_{1,4} & A_{1,5} & A_{1,6} \\ A_{2,1} & A_{2,2} & A_{2,3} & A_{2,4} & A_{2,5} & A_{2,6} \\ A_{3,1} & A_{3,2} & A_{3,3} & A_{3,4} & A_{3,5} & A_{3,6} \\ A_{4,1} & A_{4,2} & A_{4,3} & A_{4,4} & A_{4,5} & A_{4,6} \\ A_{5,1} & A_{5,2} & A_{5,3} & A_{5,4} & A_{5,5} & A_{5,6} \\ A_{6,1} & A_{6,2} & A_{6,3} & A_{6,4} & A_{6,5} & A_{6,6} \end{bmatrix} \begin{pmatrix} l_1^2 \\ 2l_1 l_2 \\ l_2^2 \\ 2l_1 l_3 \\ 2l_2 l_3 \\ l_3^2 \end{pmatrix}$$

where function $\varphi(.)$ is the $2^{nd}$ order Veronese mapping that lifts vector 3-tuple vector l to 6-dimensional space.

Detailed Derivation of Matrix A

Those skilled in the art will recognize and appreciate that there are various ways by which such a matrix (or similar information) can be provided. As but one illustrative example in this regard, and without intending any limitations, one approach to deriving Matrix A will now be provided.

In the equation above A comprises a 6×6 matrix. Constraints can be imposed on A to ensure that it will satisfy all necessary geometric constraints as follows.

1. The conic that mapped from the line at infinity $l=(0,0,1)^T$ will comprise a circle. Hence, $A_{2,6}=A_{4,6}=A_{5,6}=0$ and $A_{1,6}=A_{3,6}$. One can set $A_{1,6}=A_{3,6}=-\epsilon$ and $A_{6,6}=1$. As a result, the radius of the circle is $\sqrt{1/\epsilon}$.

$$A = \begin{bmatrix} A_{1,1} & A_{1,2} & A_{1,3} & A_{1,4} & A_{1,5} & -\varepsilon \\ A_{2,1} & A_{2,2} & A_{2,3} & A_{2,4} & A_{2,5} & 0 \\ A_{3,1} & A_{3,2} & A_{3,3} & A_{3,4} & A_{3,5} & -\varepsilon \\ A_{4,1} & A_{4,2} & A_{4,3} & A_{4,4} & A_{4,5} & 0 \\ A_{5,1} & A_{5,2} & A_{5,3} & A_{5,4} & A_{5,5} & 0 \\ A_{6,1} & A_{6,2} & A_{6,3} & A_{6,4} & A_{6,5} & 1 \end{bmatrix}$$

2. The conic that mapped from any line that passes through origin, $l=(l_1,l_2,0)^T$ is the line itself. Hence $A_{1,1}=A_{2,2}=A_{3,3}$ and the remaining entries in the first three columns of A are zeros. One can set $A_{1,1}=A_{2,2}=A_{3,3}=1$ since the scale factor can be absorbed by the virtual focal length f.

$$A = \begin{bmatrix} 1 & 0 & 0 & A_{1,4} & A_{1,5} & -\varepsilon \\ 0 & 1 & 0 & A_{2,4} & A_{2,5} & 0 \\ 0 & 0 & 1 & A_{3,4} & A_{3,5} & -\varepsilon \\ 0 & 0 & 0 & A_{4,4} & A_{4,5} & 0 \\ 0 & 0 & 0 & A_{5,4} & A_{5,5} & 0 \\ 0 & 0 & 0 & A_{6,4} & A_{6,5} & 1 \end{bmatrix}$$

3. For any horizontal line $l=(0,l_2,l_3)^T$ its mapped conic is symmetric to y-axis. In addition, all the conics mapped from horizontal lines will intersect on two points, $(\pm\sqrt{1/\epsilon}, 0)$. As a result, $A_{1,5}=A_{2,5}=A_{4,5}=A_{6,5}=0$.

$$A = \begin{bmatrix} 1 & 0 & 0 & A_{1,4} & 0 & -\varepsilon \\ 0 & 1 & 0 & A_{2,4} & 0 & 0 \\ 0 & 0 & 1 & A_{3,4} & A_{3,5} & -\varepsilon \\ 0 & 0 & 0 & A_{4,4} & 0 & 0 \\ 0 & 0 & 0 & A_{5,4} & A_{5,5} & 0 \\ 0 & 0 & 0 & A_{6,4} & 0 & 1 \end{bmatrix}$$

4. By imposing the same constraints on mapping of vertical lines to conics, one obtains $A_{2,4}=A_{3,4}=A_{5,4}=A_{6,4}=0$.

$$A = \begin{bmatrix} 1 & 0 & 0 & A_{1,4} & 0 & -\varepsilon \\ 0 & 1 & 0 & 0 & 0 & 0 \\ 0 & 0 & 1 & 0 & A_{3,5} & -\varepsilon \\ 0 & 0 & 0 & A_{4,4} & 0 & 0 \\ 0 & 0 & 0 & 0 & A_{5,5} & 0 \\ 0 & 0 & 0 & 0 & 0 & 1 \end{bmatrix}$$

5. A last geometric constraint can be based on in-plane rotation. Let l' be an in-plane rotation of l, l'=Rl with R being the rotation matrix. Let c' be the mapping from l', $C'=RCR^T$ where $$C = \begin{bmatrix} c_1 & c_2/2 & c_4/2 \\ c_2/2 & c_3 & c_5/2 \\ c_4/2 & c_5/2 & c_6 \end{bmatrix}.$$

As a result, $A_{1,4}=A_{3,5}=0$ and $A_{4,4}=A_{5,5}=1$ $$A = \begin{bmatrix} 1 & 0 & 0 & 0 & 0 & -\varepsilon \\ 0 & 1 & 0 & 0 & 0 & 0 \\ 0 & 0 & 1 & 0 & 0 & -\varepsilon \\ 0 & 0 & 0 & 1 & 0 & 0 \\ 0 & 0 & 0 & 0 & 1 & 0 \\ 0 & 0 & 0 & 0 & 0 & 1 \end{bmatrix}$$

This sparse matrix provides a linear mapping from $\phi(l)$ to c.

Point-to-Point Mapping

Based on matrix A, the mapping from point $(u,v)^T$ to virtual perspective point $(x, y)^T$ becomes $$\begin{pmatrix} x \\ y \\ 1 \end{pmatrix} \propto \begin{pmatrix} u \\ v \\ 1-\sqrt{\varepsilon(u^2+v^2)} \end{pmatrix}$$

The mapping from $(x, y)^T$ to $(u,v)^T$, on the contrary, doesn't have a closed-form solution. It can be obtained through computing the intersection between a line and a conic:

1. Given point $(x, y)^T$ find a line $l=(l_1,l_2,l_3)^T$ that passes through the point.
2. Use $c=A\phi(l)$ to obtain the conic c.
3. Let $l'=(l_1',l_2',l_3')^T$ be the line that passes through the origin $(0,0)^T$ and point $(x,y)^T$, the intersection of line l' and conic c will be point $(u,v)^T$. Denote $k=u/v$, $$v = \frac{-(c_4k + c_5) \pm \sqrt{(c_4k+c_5)^2 - 4(c_1k^2 + c_2k + c_3)c_6}}{2(c_1k^2 + c_2k + c_3)}$$

$$u = kv$$

This can comprise the general point-to-point mapping algorithm used when implementing these teachings.

Digital Pan/Tilt/Zoom (DPTZ) Applications

In a DPTZ application, and as noted above, one can raster scan the along the horizontal lines and map every perspective point $(x,y)^T$ along every given line to $(u,v)^T$. Each horizontal line together with the points lying on it will undergo translation, rotation, and scaling in accordance with the pan/tilt/zoom effect before being mapped to the conic. Then, the line-conic intersection is adopted to compute the mapping. There is one degenerated case for this approach. When the translated and rotated line passes through the origin, the line and conic will intersect on the origin. When this occurs, one can adopt a general point-to-point mapping algorithm to compute the mapping for every point on this line.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 8, an illustrative approach to such a platform will now be provided.

In this illustrative example, the apparatus 800 comprises a processor 801 of choice that operably couples to one or more memories 802. The latter can serve, for example, to store the aforementioned digital representation of a wide-angle image that is to be compensated as per these teachings. The processor, in turn, can be configured and arranged (via, for example, corresponding programming as will be well understood by those skilled in the art) to effective some or all of the various steps and functionality set forth herein. This apparatus 800 can itself comprise a part of another apparatus such as, but not limited to, a television receiver, computer, or other video display platform. In such a case, of course, the aforementioned processor 801 can comprise a multi-purpose platform that serves, in whole or in part, additional functionality as may be appropriate to the individual application setting.

Those skilled in the art will recognize and understand that such an apparatus 800 may be comprised of a plurality of physically distinct elements as is suggested by the illustration shown in FIG. 8. It is also possible, however, to view this illustration as comprising a logical view, in which case one or more of these elements can be enabled and realized via a shared platform. It will also be understood that such a shared platform may comprise a wholly or at least partially programmable platform as are known in the art.

These teachings will be readily understood to facilitate compensating a wide-angle image in a rapid and efficient manner that requires considerably less in the way of computational support than many prior art techniques that serve the same purpose. More particularly, these teachings are sufficiently computationally efficient to render them well suited for relatively intense application settings such as, but not limited to, real-time pan, tilt, and/or zoom application settings.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:
    providing a digital representation of a wide-angle image to a memory;
    identifying by a processor a first substantially straight line of pixels as will correspond to a compensated image of the wide-angle image;
    identifying by the processor a first substantially curved line of pixels in the digital representation of the wide-angle image as directly correlate to the first substantially straight line of pixels;
    identifying by the processor, for a given point for a given pixel in the first substantially straight line of pixels, a corresponding point in the first substantially curved line of pixels as a function, at least in part, of an intersection of the first substantially curved line of pixels with a second line of pixels in the wide-angle image by:
        identifying a second substantially straight line of pixels as will also correspond to the compensated image of the wide-angle image, wherein the second substantially straight line of pixels intersects with the first substantially straight line of pixels at a point of intersection;
    and at least one of:
        identifying a second substantially curved line of pixels in the digital representation of the wide-angle image as directly correlates to the second substantially straight line of pixels;
        identifying an intersection of the first and second substantially curved line of pixels by tracing the first and second substantially curved lines of pixels using a scan-rasterization algorithm;
        using the intersection of the first and second substantially curved line of pixels as the corresponding point to thereby facilitate identifying the given point for the given pixel;
    and
        identifying a substantially straight line of pixels in the digital representation of the wide-angle image as directly correlates to the second substantially straight line of pixels;
        using an intersection of the first substantially curved line of pixels and the substantially straight line of pixels in the digital representation of the wide-angle image as the corresponding point to thereby facilitate identifying the given point for the given pixel.

2. The method of claim 1 wherein identifying a first substantially straight line of pixels comprises identifying a first horizontal substantially straight line of pixels.

3. The method of claim 1 wherein the second substantially straight line of pixels as will also correspond to the compensated image of the wide-angle image at least substantially intersects a center of a lens by which the wide-angle image was captured.

4. The method of claim 1 further comprising:
    determining, for the corresponding point in the first substantially curved line of pixels, a pixel value to use for the given pixel in the first substantially straight line of pixels as will correspond to a compensated image of the wide-angle image.

5. The method of claim 1 wherein determining, for the corresponding point in the first substantially curved line of pixels, a pixel value to use for the given pixel in the first substantially straight line of pixels as will correspond to a compensated image of the wide-angle image comprises, at least in part, calculating the pixel value as a function of a plurality of pixel values that are at least proximal to the corresponding point in the first substantially curved line of pixels.

6. The method of claim 1 further comprising:
    determining when use of the substantially straight line of pixels in the digital representation of the wide-angle image as directly correlate to the second substantially straight line of pixels to identify an intersection with the first substantially curved line of pixels is undesirable and responsively:
        identifying a third substantially straight line of pixels that is at least substantially orthogonal to the first substantially straight line of pixels;
        identifying a third substantially curved line of pixels in the digital representation of the wide-angle image as directly correlates to the third substantially straight line of pixels; and
        using an intersection of the third substantially curved line of pixels and the substantially straight line of pixels in the digital representation of the wide-angle image as the corresponding point to thereby facilitate identifying the given point for the given pixel.

7. An apparatus comprising:
    a memory have a digital representation of a wide-angle image stored therein;
    a processor that is operably coupled to the memory and being configured and arranged to:

identify a first substantially straight line of pixels as will correspond to a compensated image of the wide-angle image;

identify a first substantially curved line of pixels in the digital representation of the wide-angle image as directly correlate to the first substantially straight line of pixels;

identify, for a given point for a given pixel in the first substantially straight line of pixels, a corresponding point in the first substantially curved line of pixels as a function, at least in part, of an intersection of the first substantially curved line of pixels with a second line of pixels in the wide-angle image by:

identifying a second substantially straight line of pixels as will also correspond to the compensated image of the wide-angle image, wherein the second substantially straight line of pixels intersects with the first substantially straight line of pixels at a point of intersection;

and at least one of:

identifying a second substantially curved line of pixels in the digital representation of the wide-angle image as directly correlate to the second substantially straight line of pixels;

identifying an intersection of the first and second substantially curved line of pixels by tracing the first and second substantially curved lines of pixels using a scan-rasterization algorithm;

using the intersection of the first and second substantially curved line of pixels as the corresponding point to thereby facilitate identifying the given point for the given pixel;

and identifying a substantially straight line of pixels in the digital representation of the wide-angle image as directly correlate to the second substantially straight line of pixels; and using an intersection of the first substantially curved line of pixels and the substantially straight line of pixels in the digital representation of the wide-angle image as the corresponding point to thereby facilitate identifying the given point for the given pixel.

8. The apparatus of claim 7 wherein the processor is further configured and arranged to identify a first substantially straight line of pixels by identifying a first horizontal substantially straight line of pixels.

9. The apparatus of claim 7 wherein the second substantially straight line of pixels as will also correspond to the compensated image of the wide-angle image at least substantially intersects a center of a lens by which the wide-angle image was captured.

10. The apparatus of claim 7 wherein the processor is further configured and arranged to:

determine, for the corresponding point in the first substantially curved line of pixels, a pixel value to use for the given pixel in the first substantially straight line of pixels as will correspond to a compensated image of the wide-angle image.

11. The apparatus of claim 7 wherein the processor is further configured and arranged to determine, for the corresponding point in the first substantially curved line of pixels, a pixel value to use for the given pixel in the first substantially straight line of pixels as will correspond to a compensated image of the wide-angle image by, at least in part, calculating the pixel value as a function of a plurality of pixel values that are at least proximal to the corresponding point in the first substantially curved line of pixels.

12. The apparatus of claim 7 wherein the processor is further configured and arranged to:

determine when use of the substantially straight line of pixels in the digital representation of the wide-angle image as directly correlate to the second substantially straight line of pixels to identify an intersection with the first substantially curved line of pixels is undesirable and to then responsively:

identify a third substantially straight line of pixels that is at least substantially orthogonal to the first substantially straight line of pixels;

identify a third substantially curved line of pixels in the digital representation of the wide-angle image as directly correlate to the third substantially straight line of pixels; and use an intersection of the third substantially curved line of pixels and the substantially straight line of pixels in the digital representation of the wide-angle image as the corresponding point to thereby facilitate identifying the given point for the given pixel.

* * * * *